(12) United States Patent
Sharma

(10) Patent No.: US 12,148,203 B2
(45) Date of Patent: Nov. 19, 2024

(54) CONTENT-AWARE TYPE-ON-PATH GENERATION ALONG OBJECT CONTOURS

(71) Applicant: Microsoft Technology Licensing, LLC, Redmond, WA (US)

(72) Inventor: Mrinal Kumar Sharma, Hazaribagh (IN)

(73) Assignee: Microsoft Technology Licensing, LLC., Redmond, WA (US)

( * ) Notice: Subject to any disclaimer, the term of this patent is extended or adjusted under 35 U.S.C. 154(b) by 365 days.

(21) Appl. No.: 17/744,964

(22) Filed: May 16, 2022

(65) Prior Publication Data

US 2023/0368511 A1   Nov. 16, 2023

(51) Int. Cl.
*G06V 10/82* (2022.01)
*G06V 10/42* (2022.01)
*G06V 10/44* (2022.01)
*G06V 10/77* (2022.01)
*G06V 10/774* (2022.01)

(52) U.S. Cl.
CPC .............. *G06V 10/82* (2022.01); *G06V 10/42* (2022.01); *G06V 10/454* (2022.01); *G06V 10/7715* (2022.01); *G06V 10/774* (2022.01)

(58) Field of Classification Search
CPC .. G06V 10/454; G06V 10/7715; G06V 10/42; G06V 10/774; G06V 10/82
USPC ........................................................ 382/103
See application file for complete search history.

(56) References Cited

U.S. PATENT DOCUMENTS

| 7,555,711 | B2 | 6/2009 | Chao et al. |
| 7,684,619 | B2 | 3/2010 | Sprang et al. |
| 8,473,842 | B2 | 6/2013 | Atanassov et al. |
| 8,584,012 | B1 | 11/2013 | Orshanskiy et al. |
| 8,875,035 | B2 | 10/2014 | Gehani et al. |
| 9,001,126 | B2 | 4/2015 | Burago |
| 9,201,666 | B2 | 12/2015 | Zaragoza et al. |
| 9,483,496 | B1 | 11/2016 | Washburne et al. |
| 11,244,195 | B2 * | 2/2022 | Pao .................... G06V 10/7747 |
| 11,663,806 | B2 * | 5/2023 | Jagadeesh ............ G06V 10/462 382/103 |
| 11,688,081 | B2 * | 6/2023 | Yang ...................... G06V 20/10 382/103 |
| 2008/0238927 | A1 | 10/2008 | Mansfield |
| 2014/0035926 | A1 | 2/2014 | Burago |

(Continued)

OTHER PUBLICATIONS

Liu, et al., "SCG: Saliency and Contour Guided Salient Instance Segmentation", In Journal of IEEE Transactions on Image Processing, vol. 30, Jun. 21, 2021, pp. 5862-5874.

(Continued)

*Primary Examiner* — Allen H Nguyen
(74) *Attorney, Agent, or Firm* — Foley IP Law, PLLC

(57) ABSTRACT

A method for content-aware type-on-path generation is implemented via a computing system including a processor. The method includes surfacing an image via a graphics GUI of a graphics application and detecting one or more salient objects within the image using a CNN model. The method also includes generating a contour map for each detected salient object and generating a path along the contours of each salient object by applying a defined offset to the corresponding contour map. The method further includes applying input text characters as type-on-path along the generated path based at least on user input received via the graphics GUI.

20 Claims, 9 Drawing Sheets

(56) References Cited

U.S. PATENT DOCUMENTS

| | | |
|---|---|---|
| 2014/0201622 A1 | 7/2014 | Walker |
| 2017/0322910 A1 | 11/2017 | Dhanuka et al. |
| 2020/0097604 A1* | 3/2020 | Lee .......................... G06N 3/08 |
| 2022/0122258 A1 | 4/2022 | Kumawat et al. |
| 2023/0206614 A1* | 6/2023 | Ku .......................... G06T 11/00 |
| | | 382/153 |

OTHER PUBLICATIONS

"International Search Report and Written Opinion Issued in PCT Application No. PCT/US23/013452", Mailed Date: Jun. 26, 2023, 14 Pages.

Ullah, et al., "A brief survey of visual saliency detection", In Journal of Multimedia Tools and Applications, vol. 79, Dec. 2020, pp. 34605-34645.

"Wrap Text Around Objects", Retrieved from: https://web.archive.org/web/20210518211106/https:/helpx.adobe.com/indesign/using/text-wrap.html, May 18, 2021, 10 Pages.

Chao, Hui, "Text Block Geometric Shape Analysis", In Proceedings of the ACM Symposium on Document Engineering, Oct. 10, 2006, pp. 22-24.

\* cited by examiner

CONTENT-AWARE TYPE-ON-PATH GENERATION ALONG OBJECT CONTOURS

BACKGROUND

The present disclosure relates to type-on-path tools for graphics applications. In particular, the present disclosure relates to content-aware type-on-path generation along object contours using a graphics application.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for content-aware type-on-path generation along object contours using a graphics application is described. The method is implemented in a computing system including a processor. The method includes surfacing an image via a graphics graphical user interface (GUI) of the graphics application and detecting one or more salient objects within the image using a convolutional neural network (CNN) model. The method also includes generating a contour map for each detected salient object and generating a path along the contours of each salient object by applying a defined offset to the corresponding contour map. The method further includes, applying input text characters as type-on-path along the generated path based at least on (e.g. in response to) user input received via the graphics GUI.

In another embodiment, a computing system is described. The computing system includes a processor and a computer-readable storage medium operatively coupled to the processor. The computer-readable storage medium includes computer-executable instructions that, when executed by the processor, cause the processor to surface an image via a graphics GUI of a graphics application and detect one or more salient objects within the image using a CNN model. The computer-executable instructions, when executed by the processor, also cause the processor to generate a contour map for each detected salient object and generate a path along the contours of each salient object by applying a defined offset to the corresponding contour map. The computer-executable instructions, when executed by the processor, further cause the processor to apply input text characters as type-on-path along the generated path based at least on (e.g. in response to) user input received via the graphics GUI.

In another embodiment, a computer-readable storage medium is described. The computer-readable storage medium includes computer-executable instructions that, when executed by a processor, cause the processor to surface an image via a graphics GUI of a graphics application and detect one or more salient objects within the image using a CNN model. The computer-readable storage medium also includes computer-executable instructions that, when executed by the processor, cause the processor to generate a contour map for each detected salient object and generate a path along the contours of each salient object by applying a defined offset to the corresponding contour map. The computer-readable storage medium further includes computer-executable instructions that, when executed by the processor, cause the processor to apply input text characters as type-on-path along the generated path based at least on (e.g. in response to) user input received via the graphics GUI.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1A:
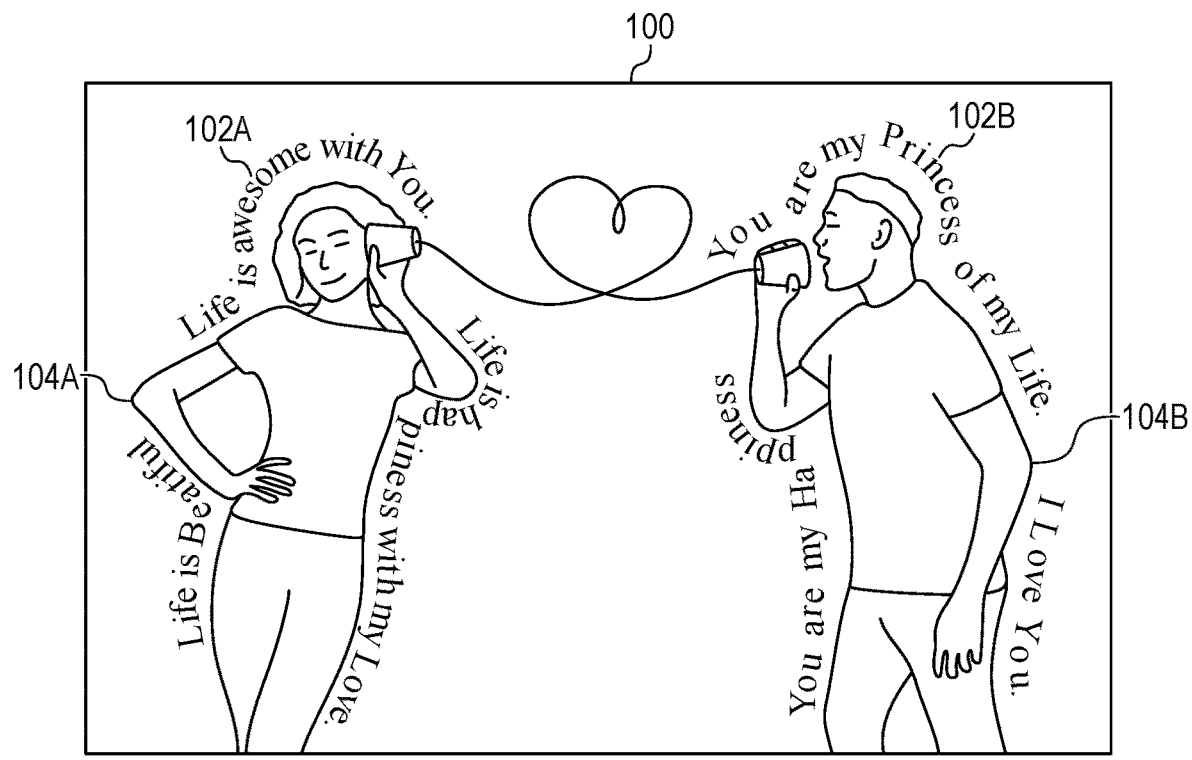
FIG. 1A is a schematic view of the desired output of the exemplary implementation of the content-aware type-on-path generation process, specifically, an image with type-on-path applied to the two salient objects within the image.

Graphics applications typically include text-related tools that enable users to utilize typography to create various types of graphic designs, such as, for example, movie posters, marketing materials, logos, customized packaging, magazine pages, and the like. Over the years, such text-related tools have grown in terms of importance and functionality, contributing to the design of increasingly complex and stunning graphic designs including text-related features. In general, the text-related tools offered by modern graphics applications provide users with a large degree of control over the textual parameters, including, for example, the character spacing, kernings, alignment, font type, font color, and the like. This, in turn, has increased the effectiveness of the visual communication provided by the resulting graphic designs, thus increasing the ease with which the target audiences are able to consume the relevant information.

Furthermore, in response to the growing importance of graphics applications, the text-related tools offered by such applications have been extended to include additional features, including a "type-on-path" feature. The type-on-path feature allows users to insert text onto a graphic design such that the text follows a desired path or shape. However, to-date, this feature is very limited in terms of supported functionality and requires a high degree of input from the user. Specifically, the user must first draw a desired shape (e.g., circle, triangle, square, or the like) or path (e.g., any desired curve), such as a path that surrounds a particular object within the corresponding image. The user may then select the type-on-path feature within the graphics application and input the desired text. The graphics application then applies the text in the direction of the selected path, for example, such that the text appears to surround the object within the image. However, in practice, the drawing of a complex curve path is difficult for many users, particularly those users who do not have formal design training. The overall impact is that only a small number of experienced designers are able to produce stunning text-based graphics using the current type-on-path feature offered by graphics applications. Moreover, even for such experienced designers, the task can become tedious and time-consuming.

In addition to the complexity of drawing the desired path using the conventional type-on-path feature, the utilization of such feature presents additional challenges, including the difficulty of adjusting the font size to ensure that the input text fits along the path in the desired manner (e.g., such that the text is not too long to fit along the path and also not too short to sufficiently fill the entire path). According to the conventional type-on-path feature, the adjustment of the font size (and/or other textual parameters) must be performed manually by the user, thus further increasing the tedious and time-consuming nature of creating the desired graphic effect.

Therefore, the present techniques address these and other issues by providing for automatic, content-aware type-on-path generation along object contours via a graphics application. Specifically, the present techniques utilize artificial-intelligence-based principles of image analysis and object detection to provide a content-aware type-on-path feature for a graphics applications. The content-aware type-on-path feature described herein automatically generates suggested paths along the contours of salient objects within an image, enabling the user to easily and efficiently select the desired path for application of the input text. In various embodiments, the detection and generation of the salient objects (as well as the corresponding contours of such objects) is accomplished in a content-aware manner using a convolutional neural network (CNN) model, such as a region-based CNN (R-CNN) model. Furthermore, the present techniques provide for the automatic adjustment of the font size for the input text without any user intervention, resulting in the generation of visually-appealing, seamlessly-accommodated type-on-path along the object contours, as described further herein.

Notably, the term "graphics application" as used herein refers to any application that provides image editing and/or formatting features with integrated text support, even if such features are not the primary purpose of the application. As a non-limiting example, if the application service provider is Microsoft Corporation, the graphics application described herein may include (but is not limited to) any number of Microsoft applications, including (but not limited to) Microsoft® Word®, Microsoft® PowerPoint®, and/or Designer on the web (among others).

As a preliminary matter, some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

Turning now to details regarding the content-aware type-on-path generation techniques described herein, FIGS. 1A-D illustrate an exemplary implementation in which type-on-path is applied to two salient objects within an image. In particular, FIG. 1A is a schematic view of the desired output of the exemplary implementation of the content-aware type-on-path generation process, specifically, an image 100 with type-on-path 102A and 102B applied to the two salient objects 104A and 104B within the image 100. As shown in FIG. 1A, the first salient object 104A is a woman, and the corresponding type-on-path 102A follows the contours of the woman within the image 100. The second salient object 104B is a man, and the corresponding type-on-path 102B follows the contours of the man within the image 100.

As described above, if the user were to utilize the conventional type-on-path feature provided by graphics applications to create the desired output shown in FIG. 1A, the user would have to manually outline the paths along the contours of the two salient objects 104A and 104B (i.e., along the silhouettes of the woman and the man). In addition, the user would have to be careful to leave some space between the contours of the object and the path so that, when the text is applied along the path, the text does not overlap with the objects themselves (as this would result in a sloppy, visually-unappealing final product). Therefore, as will be appreciated by those skilled in the art, creating the type-on-path 102A and 102B shown in FIG. 1A using the conventional type-on-path feature would require the user to exercise great skill and precision, particularly for the resulting product to be visually-appealing.

Accordingly, embodiments described herein provide a content-aware type-on-path feature that is configured to automatically detect the salient objects within the image 100 using AI-based principles relating to image analysis and object detection. In various embodiments, such AI-based principles are applied to the image using one or more CNN models, such an R-CNN model. In addition, in various embodiments, such image analysis and object detection is performed automatically in response to the selection of a content-aware type-on-path feature of the graphics application, e.g., via user input provided through a graphical user interface (GUI) surfaced by the graphics application (generally referred to herein as a "graphics GUI"). For example, in various embodiments, the user first opens the desired image 100 within the graphics GUI and then selects a content-aware type-on-path tool from a tool bar that is provided by the graphics GUI. The graphics application then automatically analyzes the image and detects the most salient objects within the image using the CNN model.

Figure 1B:
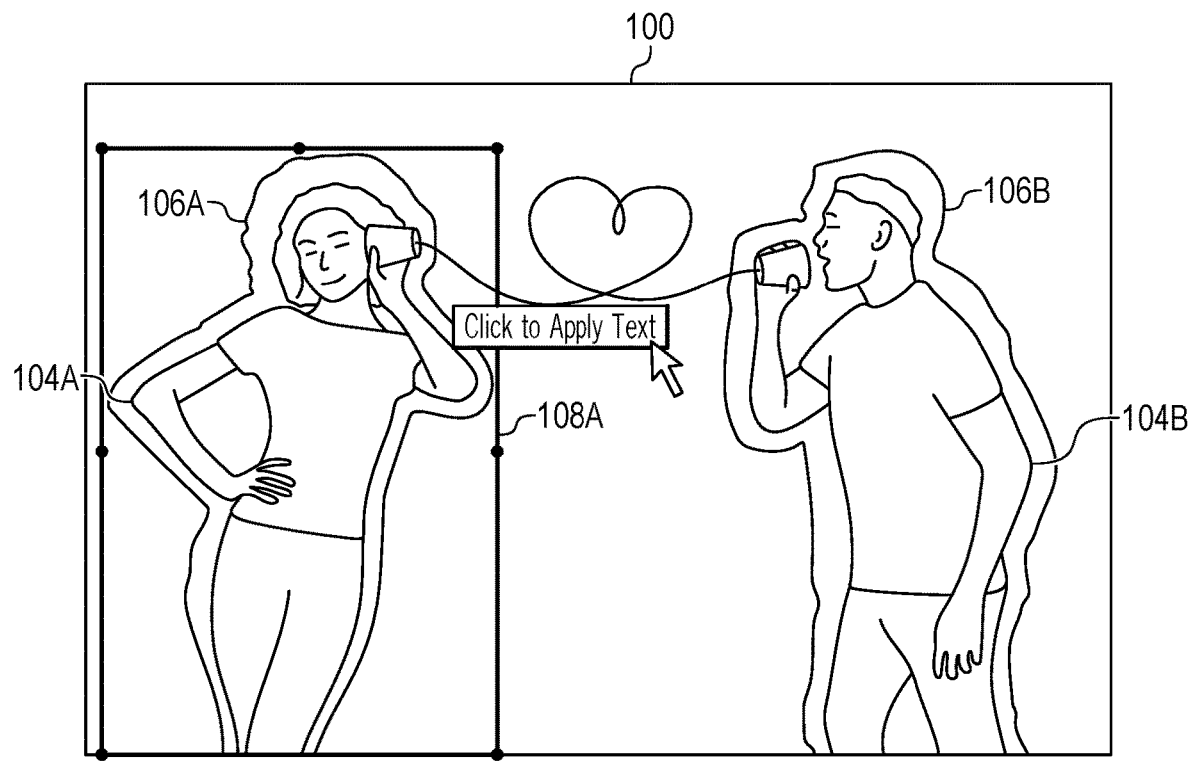
FIG. 1B is a schematic view of the image of FIG. 1A after image analysis and object detection has been performed according to embodiments described herein, resulting in the output of the two suggested paths for automatically generating type-on-path around the objects.

In various embodiments, as a result of such image analysis and object detection, the graphics GUI surfaces suggested paths 106A and 106B around the two salient objects 104A and 104B (i.e., the woman and the man, respectively) within the image 100, as shown in FIG. 1B. Specifically, FIG. 1B is a schematic view of the image 100 of FIG. 1A after image analysis and object detection has been performed according to embodiments described herein, resulting in the output of the two suggested paths 106A and 106B for automatically generating type-on-path around the objects 104A and 104B.

In various embodiments, the two paths 106A and 106B are generated by analyzing the image 100, detecting the two salient objects 104A and 104B within the image 100, and then extracting the boundaries of the salient objects 104A and 104B. In various embodiments, the boundary extraction process involves generating bounding areas (e.g., bounding boxes) and computing masks for each object 104A and 104B. The bounding areas and computing masks are used to generate a contour map for each object 104A and 104B, which is then used to generate the suggested paths 106A and 106B around the object contours.

As described further herein, in various embodiments, the graphics application automatically creates the suggested paths 106A and 106B with an offset to avoid any overlap between the applied text and the object contours (e.g., the outer edges of the objects). Additionally or alternatively, in some embodiments, the user may provide input specifying a desired offset (which may differ from the automatically-applied offset) to create interesting outputs in which the path is provided at varying distances from the object contours. In some embodiments, the user may utilize this functionality to create multiple type-on-paths around a single object, with each type-on-path having a different offset from the object contours.

Once the suggested paths 106A and 106B have been generated, user input indicating a desire to select a particular path 106A or 106B may be received via the graphics GUI, e.g., via the user clicking on the corresponding object 104A or 104B or clicking on an area surrounding the object 104A or 104B. For example, according to embodiment shown in FIG. 1B, the user indicates a desire to select the path 106A corresponding to the first salient object 104A by clicking on the bounding area 108A surrounding the first salient object 104A.

Figure 1C:
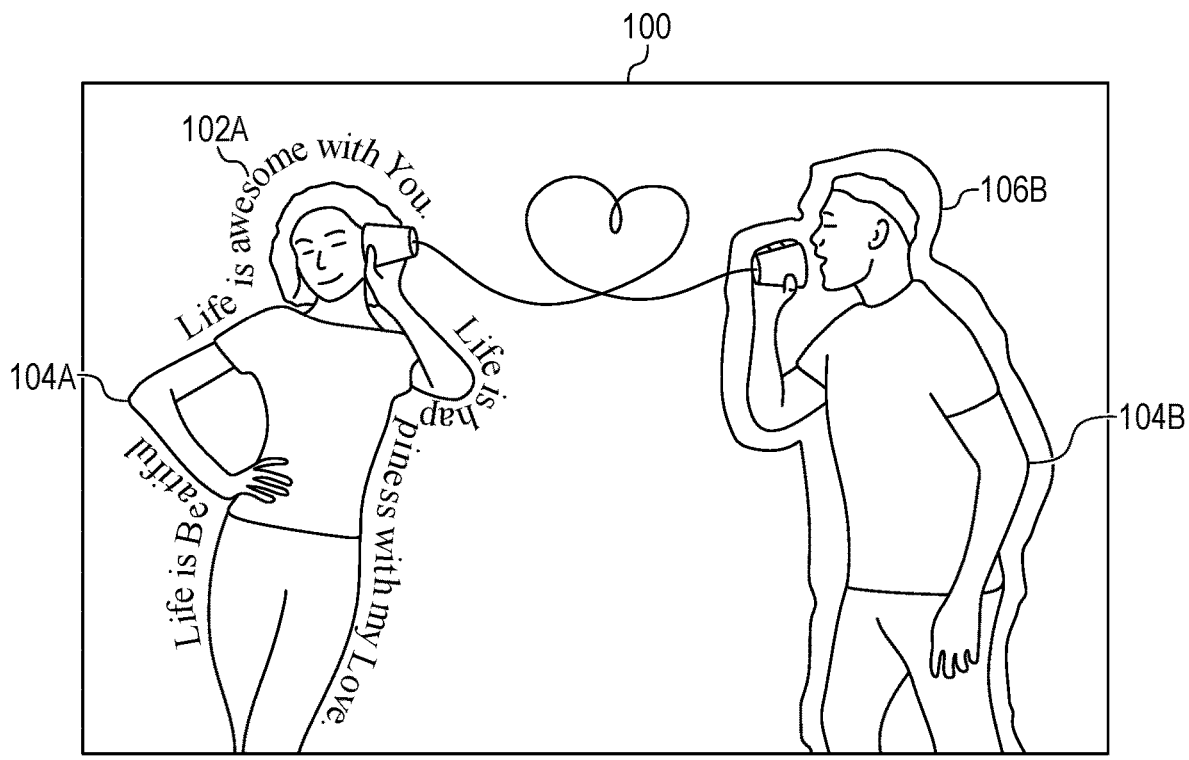
FIG. 1C is a schematic view of the image of FIGS. 1A and 1B after the type-on-path has been applied to the first salient object.

FIG. 1C is a schematic view of the image 100 of FIGS. 1A and 1B after the type-on-path 102A has been applied to the first salient object 104A (i.e., the woman). Specifically, according to the present techniques, once the user selects the first salient object 104A and inputs the desired text that is to be applied to the corresponding path 106A along the object contours, the graphics application automatically applies the text as the type-on-path 102A along the selected path 106A. Furthermore, in various embodiments, the graphics application automatically adjusts the font size for the type-on-path 102A to ensure that the text is not too long to properly fit along the path or too short to provide a symmetrical and visually-appealing output.

Figure 1D:
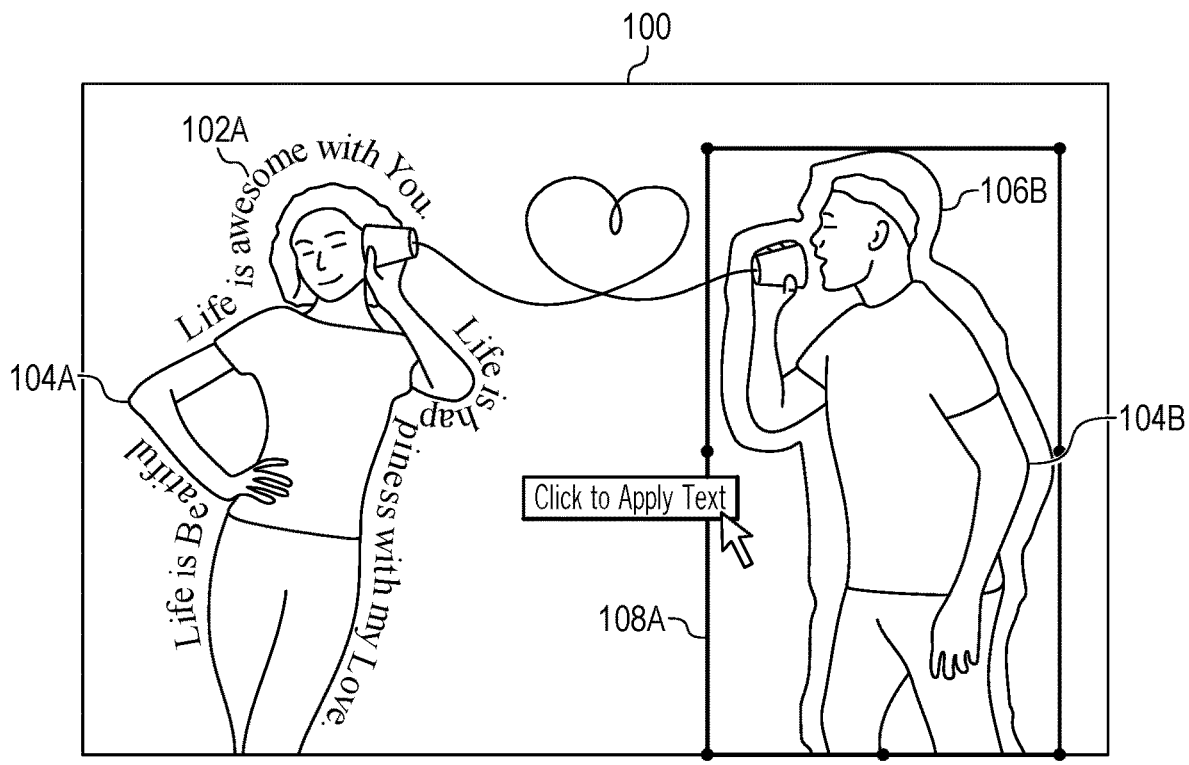
FIG. 1D is a schematic view of the image of FIGS. 1A-C depicting the manner in which the user can also select the second salient object to automatically apply the second type-on-path to the image, resulting in the desired output shown in FIG. 1A.

FIG. 1D is a schematic view of the image 100 of FIGS. 1A-C depicting the manner in which the user can also select the second salient object 104B (e.g., by clicking on the bounding area 108B surrounding the object 104B) to automatically apply the second type-on-path 102B to the image 100, resulting in the desired output shown in FIG. 1A. As will be appreciated by those skilled in the art, the present techniques therefore provide a seamless, easy, and efficient method for generating type-on-path along various object contours within an image in a short amount of time and with minimal user input.

Figure 2A:
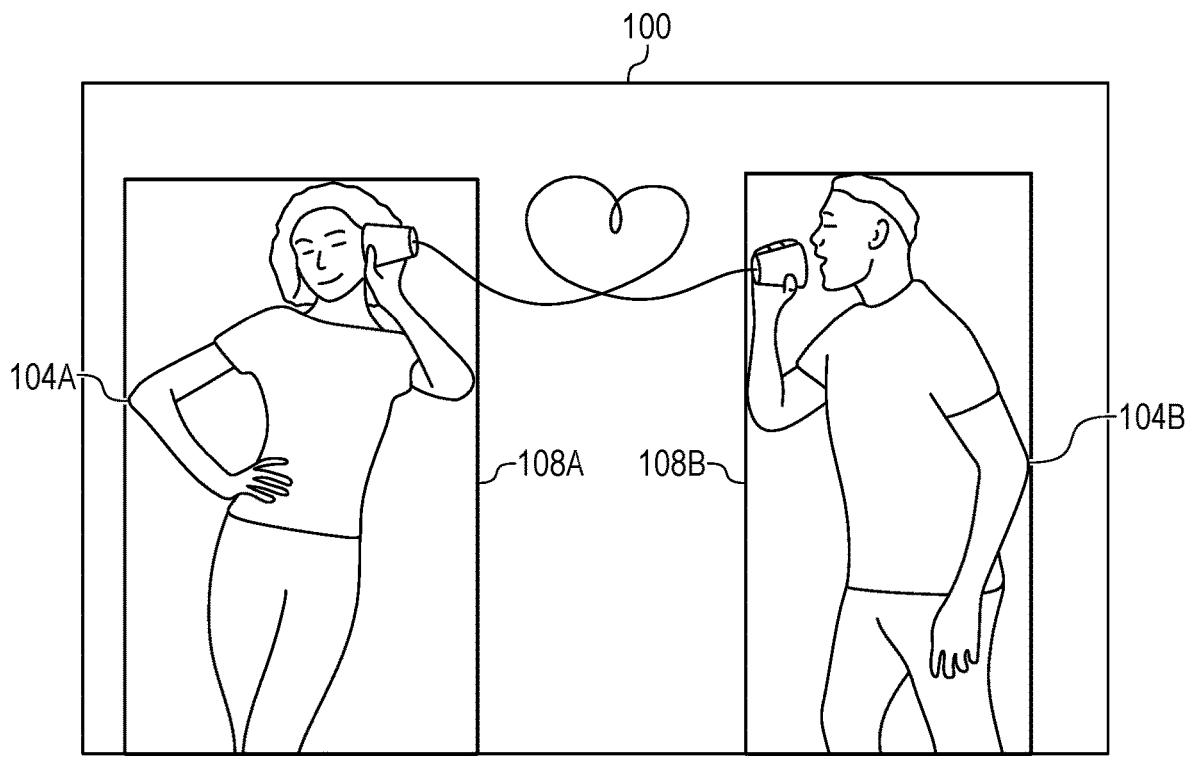
FIG. 2A is a schematic view of the image of FIGS. 1A-D, showing the bounding areas generated around the two detected salient objects.

Turning now to additional details regarding the image analysis, salient object detection, and suggested path generation functionalities provided by the present techniques, FIGS. 2A-F illustrate the exemplary implementation of FIGS. 1A-D from the perspective of the computing system(s)/server(s) that provide for the execution of the corresponding graphics application. (Like numbered items in FIGS. 2A-F are as described with respect to FIGS. 1A-D). In particular, FIG. 2A is a schematic view of the image 100 of FIGS. 1A-D, showing the bounding areas 108A and 108B generated around the two detected salient objects 104A and 104B (i.e., the woman and the man). In various embodiments, this is accomplished by analyzing the image 100, generating potential object proposals, and then detecting the two salient objects 104A and 104B based on the generated object proposals. In various embodiments, an R-CNN model, such as a Faster-R-CNN model, is used for this purpose. Moreover, in various embodiments, R-CNN model detects the two salient objects 104A and 104B in the image 100 by computing saliency (or importance) scores for each generated potential object proposal and then selecting the objects with the highest saliency scores as the salient objects to which type-on-path is likely to be applied. For example, in such embodiments, the process described herein may involve selecting any and all objects with saliency scores above a predefined threshold and providing paths around such objects for potential type-on-path generation.

In various embodiments, the utilized R-CNN model is trained on an open image dataset. As a non-limiting example, the R-CNN model may be trained using an open image dataset including around 500 to around 1500 (e.g., around 900) object classes, although the exact number of object classes utilized may vary depending on the details of the particular implementation, with additional object classes being added over time. Specifically, the R-CNN object detector is trained to detect object boundaries and corresponding tag vectors, resulting in the generation of at least three outputs, namely, the bounding area, confidence score, and label vector for each object. Subsequently, the R-CNN model may be continuously (or intermittently) updated to account for new object classes that have been added to the open image dataset. In this manner, the R-CNN model utilized according to embodiments described herein may be trained to account for the majority of object classes or categories that are encountered in typical graphics applications, thus increasing the accuracy and efficiency of the overall type-on-path generation process.

Figure 2B:
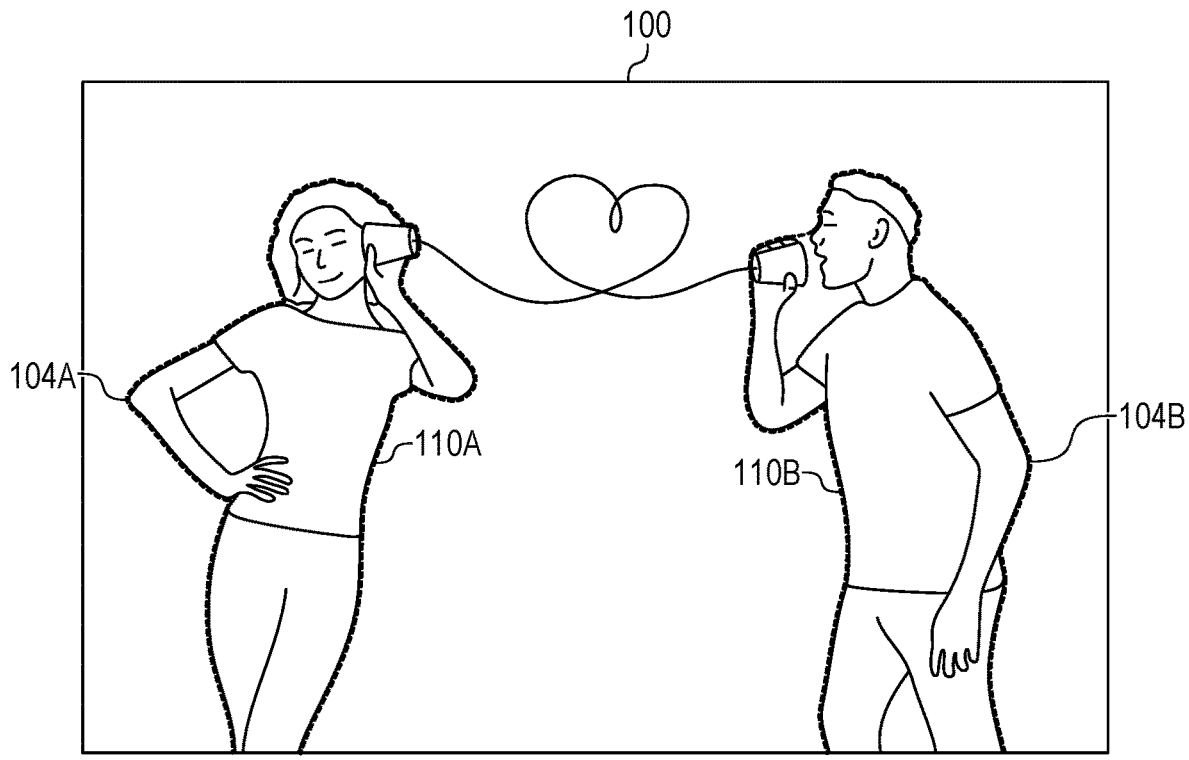
FIG. 2B is a schematic view of the image with generated contour maps marked by dotted lines around the contours of the two salient objects.

FIG. 2B is a schematic view of the image 100 with generated contour maps 110A and 110B marked by dotted lines (or running ants) around the contours of the two salient objects 104A and 104B. In various embodiments, the generation of the contour map 110A and 110B around each object 104A and 104B, respectively, involves at least two steps: (1) the identification of the mask for each object 104A and 104B; and (2) the generation of the contour maps 110A and 110B along the edges of each object 104A and 104B, respectively, based on the corresponding mask. More specifically, once the bounding areas 108A and 108B for the objects 104A and 104B have been generated, the bounding areas 108A and 108B are analyzed to generate the masks for each object 104A and 104B. In various embodiments, this is accomplishing by automatically performing a deep cut-out to segment (or separate) the foreground object from the background area in each bounding area 108A and 108B. Furthermore, once the object masks have been generated, the edges or contours of the objects are extracted from the masks. This results in the generation of the contour maps 110A and 110B for the objects 104A and 104B, which are highlighted using dots (or running ants) in FIG. 2B.

Once the contour maps 110A and 110B have been generated, the suggested paths 106A and 106B for applying the type-on-path 102A and 102B are generated. As described herein, each path 106A or 106B is provided with a defined offset from the corresponding contour map 110A or 110B, respectively. Such defined offset may be a default offset that is automatically applied by the graphics application or may be a user-specified offset. In other words, the defined offset is configurable in the graphics application, e.g., via the graphics GUI.

Figure 2C:
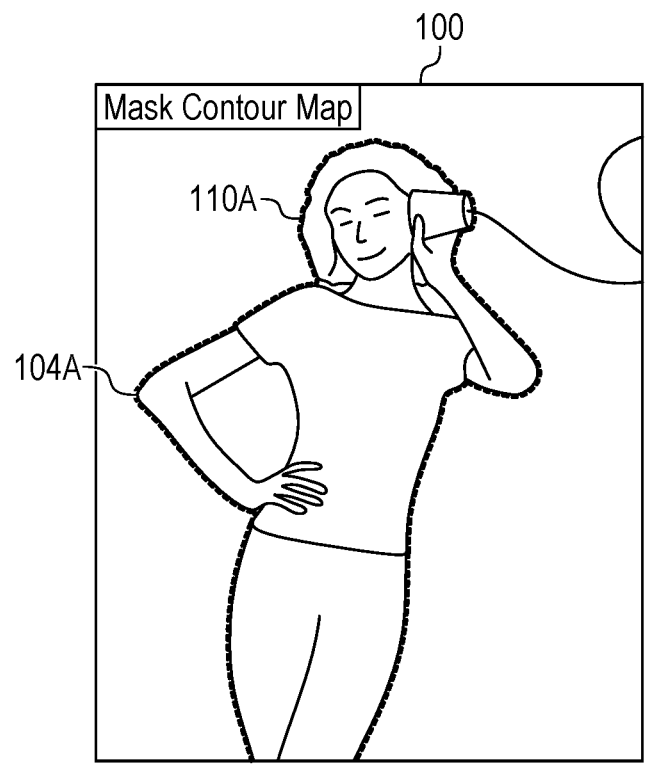
FIG. 2C is a schematic view of a portion of the image including the first salient object, with the contour map around the object highlighted using dots (or running ants)
Figure 2D:
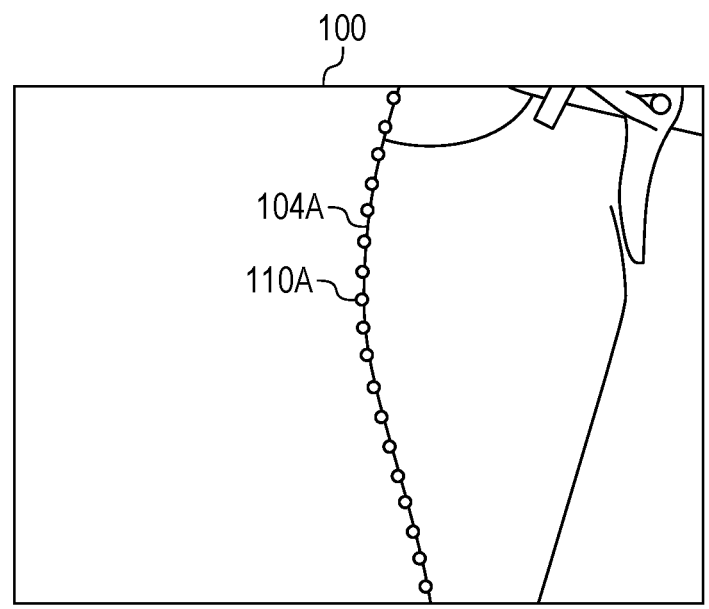
FIG. 2D is a schematic view of a zoomed-in portion of the image including a portion of the first salient object and a portion of the corresponding contour map.
Figure 2E:
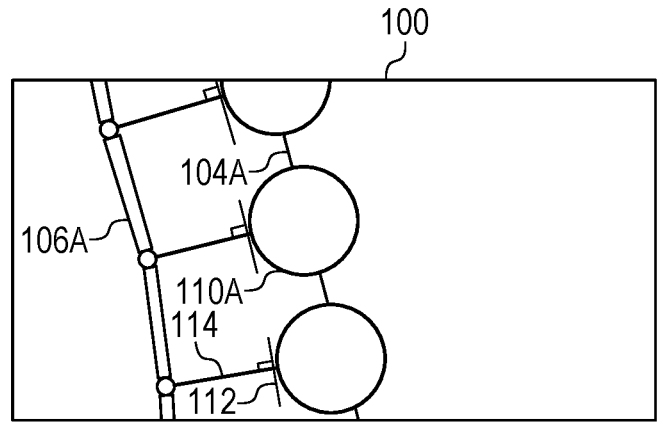
FIG. 2E is a schematic view of a further zoomed-in portion of the image including a smaller portion of the first salient object and a smaller portion of the corresponding contour map, which shows the manner in which the defined offset is applied during the generation of the path along the object contours.
Figure 2F:
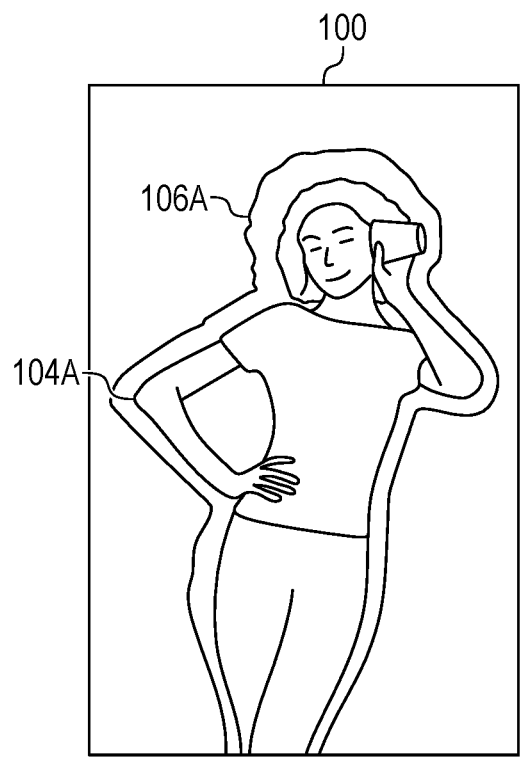
FIG. 2F is a schematic view of a portion of the image showing the final path applied along the contours of the first salient object.

The process for generating the suggested path 106A around the first salient object 104A (i.e., the woman) is illustrated by FIGS. 2C-F. Specifically, FIG. 2C is a schematic view of a portion of the image 100 including the first salient object 104A, with the contour map 110A around the object 104A highlighted using dots (or running ants). FIG. 2D is a schematic view of a zoomed-in portion of the image 100 including a portion of the first salient object 104A and a portion of the corresponding contour map 110A. Moreover, FIG. 2E is a schematic view of a further zoomed-in portion of the image 100 including a smaller portion of the first salient object 104A and a smaller portion of the corresponding contour map 110A, which shows the manner in which the defined offset is applied during the generation of the path 106A along the object contours. In particular, taking 4 pixels as the exemplary defined offset (e.g., Offset_Delta=4 pixels), FIG. 2E shows the manner in which the 4-pixel offset is applied between the contour map 110A and the path 106A surrounding the object 104A. Specifically, on each point of the contour map 110A (or at predefined intervals along the contour map 110A), a first tangential line 112 is generated tangentially to the corresponding point on the contour map 110A. A perpendicular line 114 is then generated perpendicularly to the first tangential line 112, where the length of the perpendicular line 114 is equal to the defined offset, e.g., 4 pixels in this example. The end of the perpendicular line 114 is then marked as one coordinate of the path 106A, and the process is repeated for each point of the contour map 110A (or at each predefined interval along the contour map 110A). Once the entire process is complete, the continuous path 106A around the object 104A is generated by joining all the marked coordinates together. The resulting path 106A is thus applied at an offset of 4 pixels from the object contours, as shown in FIG. 2F. Specifically, FIG. 2F is a schematic view of a portion of the image 100 showing the final path 106A applied along the contours of the first salient object 104A.

Once the final paths 106A and 106B have been generated around the objects 104A and 104B, the text may be applied along the paths 106A and 106B to generate the type-on-path 102A and 102B shown in the final output of FIG. 1A. In various embodiments, this process is accomplished by first calculating a second tangential line that is tangential to the corresponding path 106A or 106B at each predefined text interval along the contour map 110A or 110B. In various embodiments, the predefined text interval is determined based on the initial selected font size and may be equal to one half of the character width at the selected font size plus a predefined delta value, i.e., character_width/2+delta. The characters corresponding to the input text are then applied perpendicularly to the generated second tangential lines along the corresponding path 106A or 106B.

In various embodiments, once the text characters have been applied along the path 106A or 106B, the final font size may be adjusted based on any remaining characters to be applied to the path 106A or 106B. In particular, if all the characters are applied and there is still additional space along the path 106A or 106B, the text may simply be centralized along the path 106A or 106B. Alternatively, the font size may be automatically increased such that the characters fill the entire path 106A or 106B. On the other hand, if the entire path 106A or 106B is full of characters and there are still remaining characters to be applied, the font size may be automatically decreased to accommodate the remaining characters. In various embodiments, this is accomplished by calculating the width of the remaining characters and then decreasing the font size accordingly to completely accommodate the text. As an example, suppose the entire text to be applied to a particular path is "This Is Awesome Weather Here," but the word "Here" does not fit along the path after applying the text to the path with a font size of 14. In this case, the remaining length (Remaining_Length) is equal to the width of "Here" at the current font size plus three times the delta value, i.e., (Width of (Here) @fontsize+(3*delta)). Moreover, the length of the path (Path_Length) is equal to the width of "This Is Awesome Weather" plus the total number of characters times the delta value, i.e., (Width of (This Is Awesome Weather)+(20*delta)). The final font size would then be equal to Path_Length/(Number_Characters+(Number_Characters−1)*delta), where Number_Characters is the total number of characters in the input text. The text may then be reapplied along the path according to the final font size by recalculating the second tangential lines along the path, as described above.

Those skilled in the art will appreciate that the exemplary implementations of the content-aware type-on-path generation techniques described with respect to FIGS. 1A-D and 2A-F are for illustrative purposes only. In practice, the techniques described herein may be implemented in any other suitable manner to achieve any other suitable results, depending on the details of the particular implementation.

Figure 3:
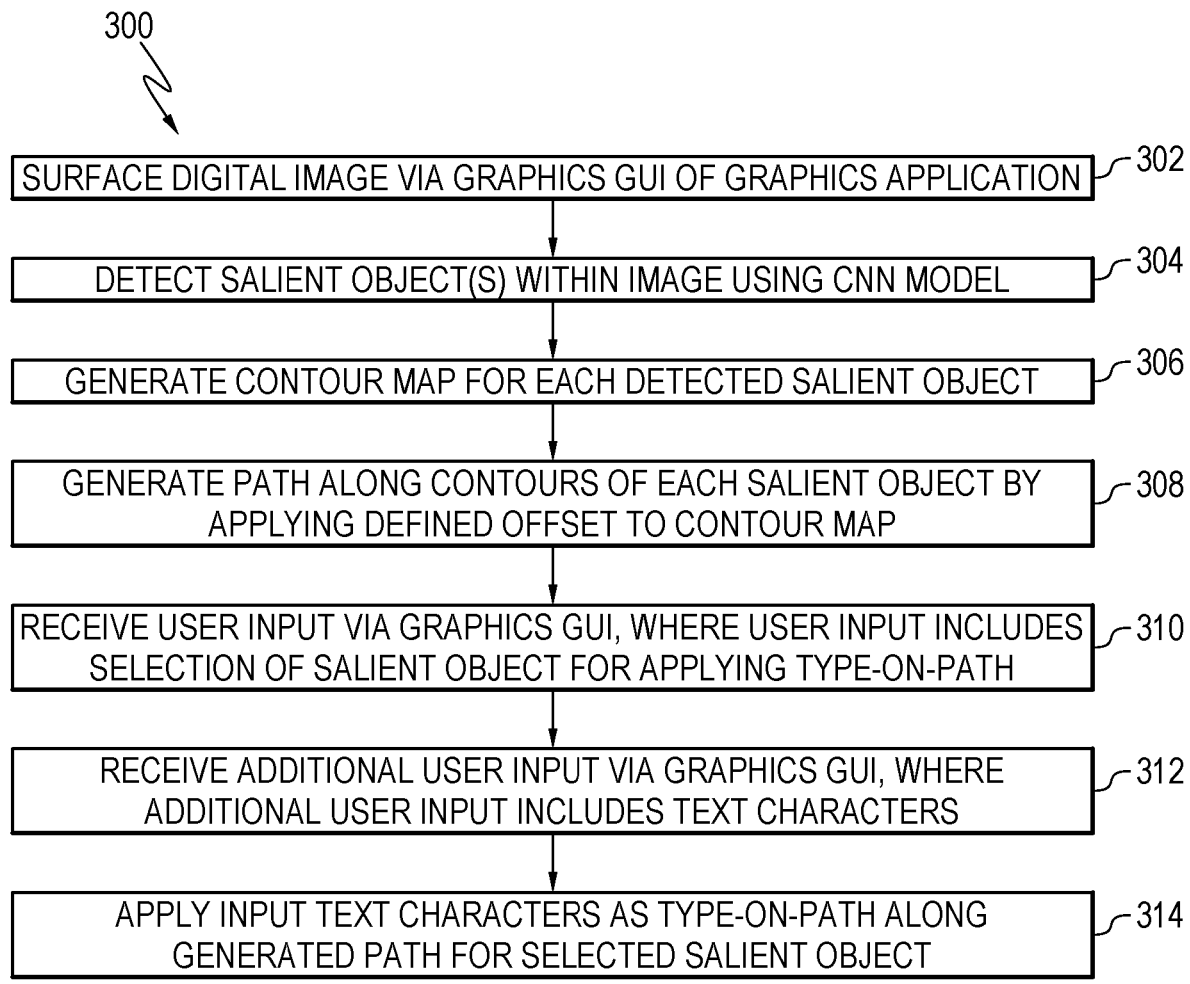
FIG. 3 is a process flow diagram of a method for content-aware type-on-path generation along object contours using a graphics application according to embodiments described herein.

FIG. 3 is a process flow diagram of an exemplary method 300 for content-aware type-on-path generation along object contours using a graphics application according to embodiments described herein. The method 300 is executed via one or more computing systems, such as the exemplary computing system described with respect to FIG. 4. In particular, in various embodiments, the computing system(s) implementing the method 300 includes computing system(s) or server(s) that are run by an application service provider that provides for the execution of one or more graphics applications on remote computing systems. The computing system(s) include one or more processors and one or more computer-readable storage media including computer-executable instructions that, when executed by the processor(s), cause the processor(s) to perform the blocks of the method 300. An exemplary embodiment of such computer-readable storage media is described with respect to FIG. 6. Moreover, in various embodiments, the method 300 is executed within the context of a network environment including one or more application service provider computing system(s)/server(s), as described further with respect to the exemplary network environment of FIG. 5.

The method 300 begins block 302, at which an image is surfaced via a graphics GUI of a graphics application. In various embodiments, the image is a digital image that has been opened by the graphics application in response to user input received via the graphics GUI. More specifically, for embodiments in which the computing system(s)/server(s) executing the method 300 are run by the application service provider that provides for the execution of the graphics applications on remote computing systems, the computing system(s)/server(s) may facilitate the execution of the graphics application on a remote computing system and the surfacing of the graphics GUI on a display device of the remote computing system during the execution of such graphics application. In other embodiments, the graphics application is run locally on the computing system that is operated by the user, in which case the computing system executing the method 300 provides for the execution of the graphics application and the surfacing of the graphics GUI on a corresponding local display device.

At block 304, one or more salient objects are detected within the image using a CNN model (e.g., an R-CN model). In various embodiments, this includes analyzing the image, generating potential object proposals by computing bounding areas around the potential objects within the image, computing saliency scores for each generated potential object proposal, and then selecting the object(s) with the highest saliency scores as the salient object(s) to which type-on-path is likely to be applied. In such embodiments, this may further include selecting any and all objects with saliency scores above a predefined threshold as the salient object(s) within the image. The identified salient object(s), as well as the corresponding bounding area(s), are then used as the input to block 306.

At block 306, a contour map is generated for each detected salient object. In various embodiments, this includes generating a mask for each salient object based on the corresponding bounding area, extracting the object contours for each salient object from the corresponding mask, and then generating the contour map for each salient object based on the corresponding extracted object contours, as described herein. Moreover, in some embodiments, the method 300 also includes visually highlighting the contour map for each salient object, e.g., using dots (or running ants) applied to the image surfaced by the graphics GUI.

At block 308, a path is generated along contours of each salient object by applying a defined offset to the contour map. In various embodiments, this includes generating first tangential lines tangentially to the contour map at predefined intervals along the contour map, generating perpendicular lines perpendicularly to the first tangential lines (where the length of each perpendicular line is equal to the defined offset), marking an end of each perpendicular line as a coordinate of the path, and joining all the marked coordinates together to generate the final path along the object contours. Furthermore, in various embodiments, the generated path for each salient object is then visually highlighted via the graphics GUI, e.g., by applying bright-colored lines to the surfaced image.

In some embodiments, the defined offset that is applied at block 308 is a default offset that is automatically applied by the corresponding graphics application. In other embodiments, the defined offset is a user-defined offset, which may be specified based on user input received via the graphics application.

At block 310, user input is received via the graphics GUI, where the user input includes a selection of a salient object for applying type-on-path. At block 312, additional user input is received via the graphics GUI, where the additional user input includes input text characters that are to be applied as the type-on-path along the object contours.

At block 314, the input text characters are applied along the path, generating the desired type-on-path within the image. In various embodiments, this includes generating second tangential lines tangentially to the path at predefined intervals along the path and then applying the input text characters perpendicularly to the second tangential lines. Moreover, in various embodiments, the text characters are applied with the initial, user-selected (or default) font size. Furthermore, in various embodiments, the method 300 further includes adjusting the font size based on any remaining text characters that do not fit along the path at the initial font size (or, alternatively, based on any remaining space within the path that remains unfilled by the text characters at the initial font size). This may include computing an adjusted font size that would enable all the input text characters to be applied evenly along the path, recalculating the second tangential lines according to the adjusted font size, and reapplying the input text characters perpendicularly to the second tangential lines at the adjusted font size.

The block diagram of FIG. 3 is not intended to indicate that the blocks of the method 300 are to be executed in any particular order, or that all of the blocks of the method 300 are to be included in every case. Moreover, any number of additional blocks may be included within the method 300, depending on the details of the specific implementation. For example, in various embodiments, the method 300 also includes training the CNN model based on object classes within one or more image datasets. In such embodiments, the CNN model may be continuously (or intermittently) updated to account for new object classes that are added to the image dataset(s). In this manner, the CNN model described herein is trained to accurately detect an ever-increasing number of different types of salient objects within images.

The present techniques provide various advantages over conventional type-on-path solutions. As an example, the present techniques provide for the automatic, neural-network-based analysis of image content and the extraction of salient objects that may be used for type-on-path generation. As another example, the present techniques enable paths around salient objects to be automatically generated with a defined offset to provide a visually-appealing final output. As another example, the present techniques provide for the automatic adjustment of the font size for the input text such that the type-on-path is seamlessly applied along the corresponding path. As another example, the present techniques are performed with minimal user input, thus increasing the ease with which type-on-path can be applied to digital images. As another example, the present techniques utilize a CNN model that can be continuously (or intermittently) updated to account for new object classes, thus ensuring that the most salient objects are correctly identified within the images.

Figure 4:
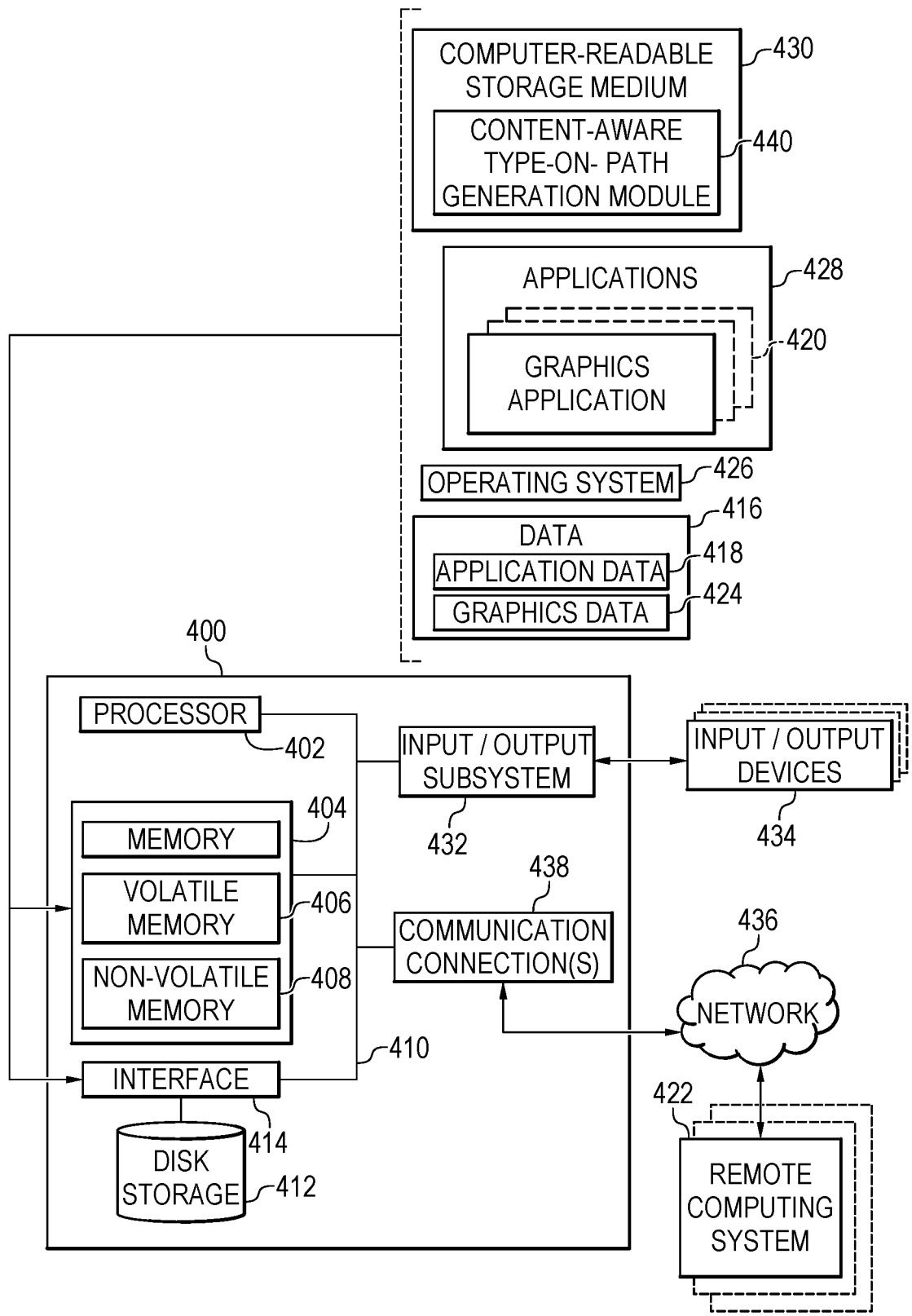
FIG. 4 is a block diagram of an exemplary computing system for implementing the content-aware type-on-path generation techniques described herein.

FIG. 4 is a block diagram of an exemplary computing system 400 for implementing the content-aware type-on-path generation techniques described herein. The exemplary computing system 400 includes a processor 402 and a memory 404. The processor 402 may include any suitable type of processing unit or device, such as, for example, a single-core processor, a multi-core processor, a computing cluster, or any number of other configurations. Moreover, the processor 402 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 404 typically (but not always) includes both volatile memory 406 and non-volatile memory 408. The volatile memory 406 retains or stores information so long as the memory is supplied with power. By contrast, the non-volatile memory 408 is capable of storing (or persisting) information even when a power supply is not available. The volatile memory 406 may include, for example, RAM (e.g., synchronous RAM (SRAM), dynamic RAM (DRAM), synchronous dynamic RAM (SDRAM), and the like) and CPU cache memory. The nonvolatile memory 408 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 402 and the memory 404, as well as other components of the computing system 400, are interconnected by way of a system bus 410. The system bus 410 can be implemented using any suitable bus architecture known to those skilled in the art.

According to the embodiment shown in FIG. 4, the computing system 400 also includes a disk storage 412. The disk storage 412 may include any suitable removable/non-removable, volatile/non-volatile storage component or device. For example, the disk storage 412 may include, but is not limited to, a magnetic disk drive, floppy disk drive, tape drive, Jaz drive, Zip drive, LS-210 drive, flash memory card, memory stick, or the like. In addition, the disk storage 412 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 412 to the system bus 410, a removable or non-removable interface is typically used, such as interface 414 shown in FIG. 4.

In various embodiments, the disk storage 412 and/or the memory 404 function as one or more databases that are used to store data 416 relating to the techniques described herein. Such data 416 may include, but are not limited to, application data 418 obtained from the execution of one or more graphics application(s) 420 on various remote computing systems 422. According to embodiments described herein, such application data 418 may include data relating to a content-aware type-on-path functionality of the graphics application(s) 420. Such data 416 may also include, but are not limited to, graphics data 424 corresponding to any number of graphic images that are created and/or edited using the graphics application(s) 420.

Those skilled in the art will appreciate that FIG. 4 describes software that acts as an intermediary between a user of the computing system 400 and the basic computing resources described with respect to the operating environment of the computing system 400. Such software includes an operating system 426. The operating system 426, which may be stored on the disk storage 412, acts to control and allocate the computing resources of the computing system 400. Moreover, system applications 428, including the graphics application(s) 420, take advantage of the management of the computing resources by the operating system 426 through one or more program modules stored within a computer-readable storage medium (or media) 430, as described further herein.

The computing system 400 also includes an input/output (I/O) subsystem 432. The I/O subsystem 432 includes a set of hardware, software, and/or firmware components that enable or facilitate inter-communication between the user of the computing system 400 and the processor 402 of the computing system 400. During operation of the computing system 400, the I/O subsystem 432 enables the user to interact with the computing system 400 through one or more I/O devices 434. Such I/O devices 434 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 402 through the system bus 410 via one or more interface ports (not shown) integrated within the I/O subsystem 432. Such interface ports may include, for example, a serial port, a parallel port, a game port, and/or a universal serial bus (USB).

In addition, such I/O devices 434 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 400 and to output information from the computing system 400 to a corresponding output device. Moreover, in some embodiments, the one or more output devices or channels are accessible via one or more adapters (not shown) integrated within the I/O subsystem 432.

In various embodiments, the computing system 400 is communicably coupled to any number of remote computing systems 422. The remote computing system(s) 422 may include, for example, one or more personal computers (e.g., desktop computers, laptop computers, or the like), one or more tablets, one or more mobile devices (e.g., mobile phones), one or more network PCs, and/or one or more workstations. As an example, in some embodiments, the computing system 400 is an application service provider server hosting the graphics application(s) 420 in a networked environment using logical connections to the remote computing systems 422. In such embodiments, the computing system 400 provides for the execution of the graphics application(s) 420 on the remote computing systems 422 with the enhanced functionality provided by the content-aware type-on-path generation techniques described herein.

In various embodiments, the remote computing systems 422 are logically connected to the computing system 400 through a network 436 and then connected via a communication connection 438, which may be wireless. The network 436 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 438 includes the hardware/software employed to connect the network 436 to the bus 410. While the communication connection 438 is shown for illustrative clarity as residing inside the computing system 400, it can also be external to the computing system 400. The hardware/software for connection to the network 436 may include, for example, internal and external technologies, such as mobile phone switches, modems including regular telephone grade modems, cable modems and DSL modems, ISDN adapters, and/or Ethernet cards.

As described above, the system applications 428, such as the graphics application(s) 420, take advantage of the management of the computing resources by the operating system 426 through one or more program modules stored within the computer-readable storage medium (or media) 430. In some embodiments, the computer-readable storage medium 430 is integral to the computing system 400, in which case it may form part of the memory 404 and/or the disk storage 412. In other embodiments, the computer-readable storage medium 430 is an external device that is connected to the computing system 400 when in use.

In various embodiments, the one or more program modules stored within the computer-readable storage medium 430 include program instructions or code that may be executed by the processor 402 to perform various operations. In various embodiments, such program modules include, but are not limited to, a content-aware type-on-path generation module 440 that causes the processor 402 to perform operations that result in the execution of the content-aware type-on-path generation techniques provided herein, as described with respect to the method 300 of FIG. 3, for example. In particular, in various embodiments, the execution of the graphics application(s) 420 in conjunction with the content-aware type-on-path generation module 440 may result in the generation of type-on-path along the contours of one or more objects within one or more graphic images that are created and/or edited using the graphics application(s) 420.

It is to be understood that the block diagram of FIG. 4 is not intended to indicate that the computing system 400 is to include all of the components shown in FIG. 4. Rather, the computing system 400 can include fewer or additional components not illustrated in FIG. 4 (e.g., additional applications, additional modules, additional memory devices, additional network interfaces, etc.). Furthermore, any of the functionalities of the one or more program modules/sub-modules may be partially, or entirely, implemented in hardware and/or in the processor 402. For example, the functionality may be implemented with an application specific integrated circuit, in logic implemented in the processor 402, or in any other device.

Figure 5:
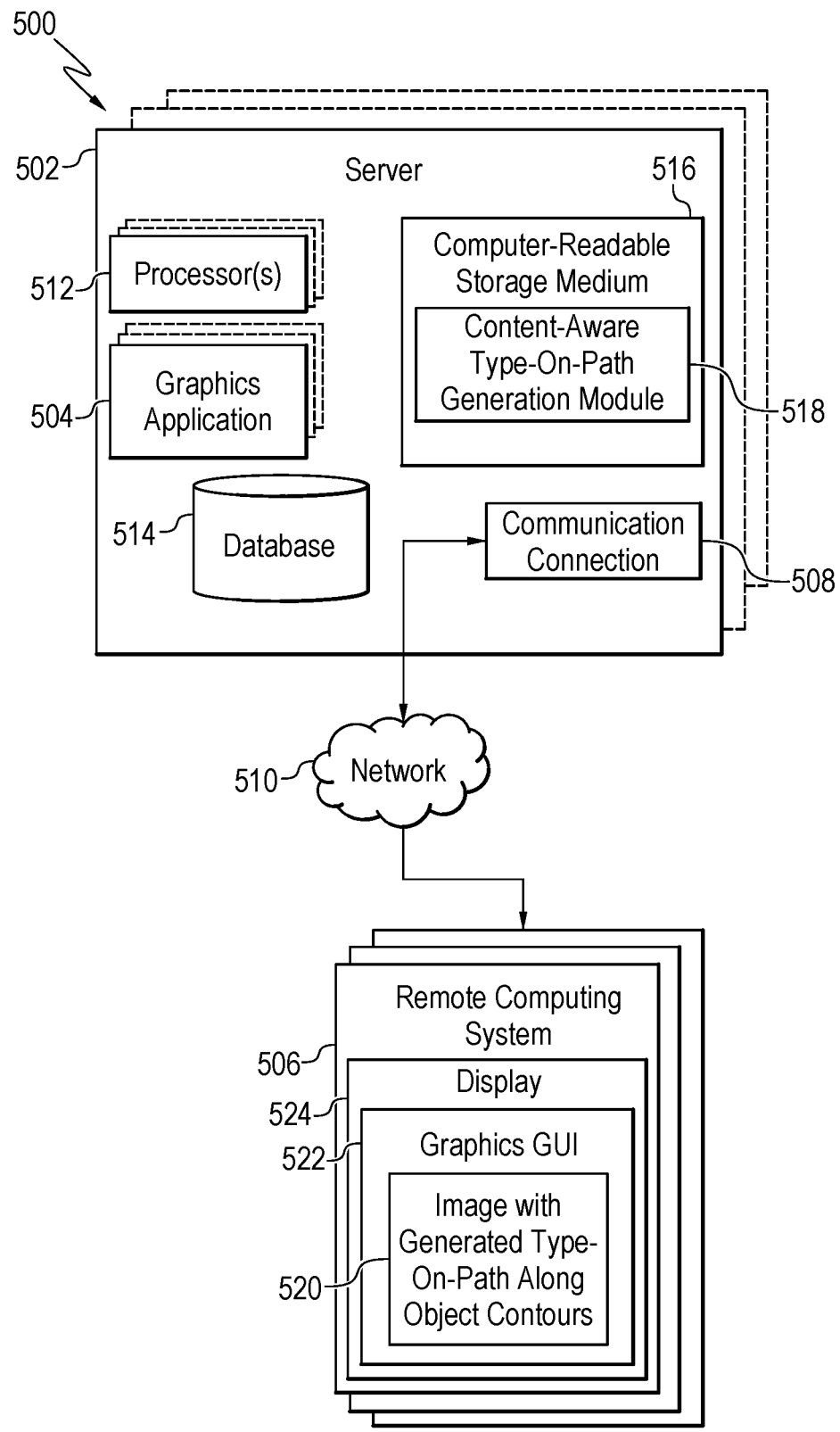
FIG. 5 is a block diagram of an exemplary network environment for implementing the content-aware type-on-path generation techniques described herein.

FIG. 5 is a block diagram of an exemplary network environment 500 for implementing the content-aware type-on-path generation techniques described herein. As shown in FIG. 5, the network environment 500 includes one or more server(s) 502 that provide for the execution of the techniques described herein. In various embodiments, the server(s) 502 are operated by an application service provider that provides for the execution of one or more graphics application(s) 504. In addition, the network environment 500 may include any number of remote computing systems 506.

In various embodiments, the server(s) 502 are configured to communicate with the remote computing system(s) 506 via a communication connection 508 and a corresponding network 510 (e.g., using one or more application programming interfaces (APIs) corresponding to the graphics application(s) 504, for example). The network 510 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, the server(s) 502 include one or more processors 512, as well as a database 514 that functions as a repository for the data that is generated and maintained according to embodiments described herein. Such data may include, but are not limited to, application data and video data, as described with respect to FIG. 4. In addition, the server(s) 502 include a computer-readable storage medium 516 including a content-aware type-on-path generation module 518 that directs the processor(s) 512 to generate type-on-path along the contours of one or more objects within one or more graphic images 520 during the execution of the graphics application(s) 504 on the remote computing system(s) 506.

In some embodiments, the server(s) 502 maintains the code corresponding to the graphics application(s) 504. In such embodiments, the server(s) 502 may host the graphics application(s) 504 on the remote computing system(s) 506 via the network 510 (e.g., using the corresponding APIs). In particular, the server(s) 502 provide for execution of the graphics application(s) 504 on the remote computing system (s) 506 by surfacing a graphics GUI 522 on a display 524 corresponding to each remote computing system 506. The graphic image(s) 520 with the generated type-on-path along the object contours can then be surfaced via the graphics GUI 522.

It is to be understood that the simplified block diagram of FIG. 5 is not intended to indicate that the network environment 500 is to include all of the components shown in FIG. 5. Rather, the network environment 500 may include different components and/or additional components not illustrated in FIG. 5. For example, in practice, the server(s) 502 will include a number of additional components not depicted in the simplified block diagram of FIG. 5, as described with respect to the computing system 400 of FIG. 4, for example.

Figure 6:
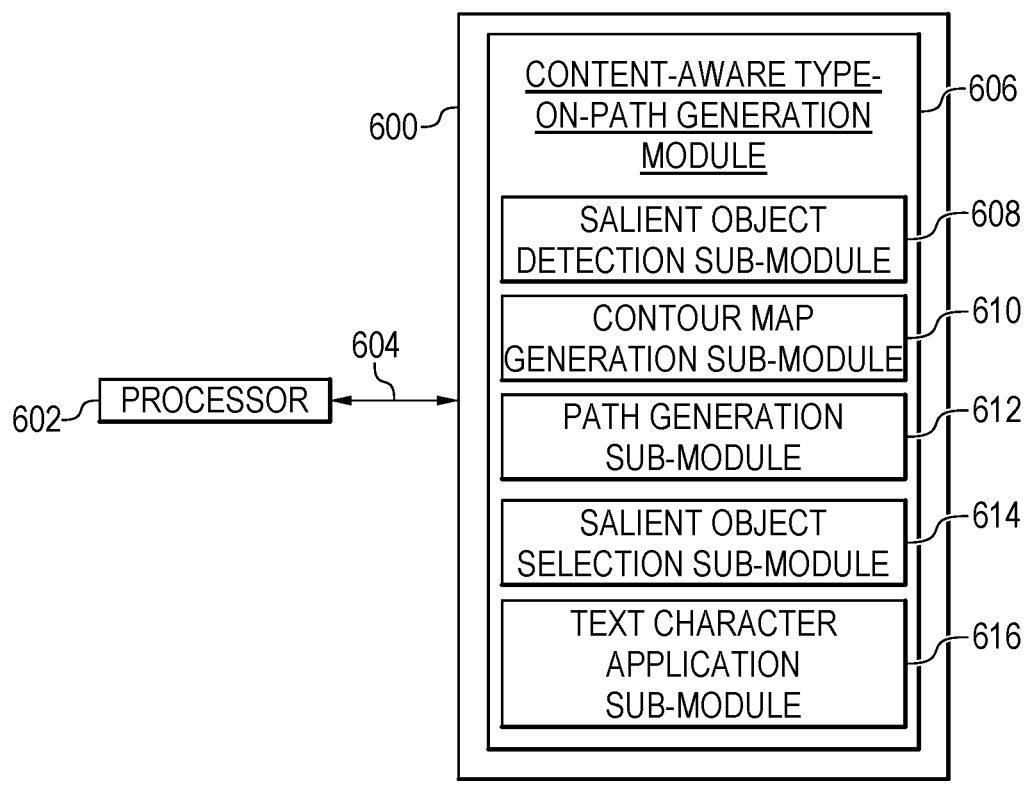
FIG. 6 is a block diagram of an exemplary computer-readable storage medium for implementing the content-aware type-on-path generation techniques described herein.

FIG. 6 is a block diagram of an exemplary computer-readable storage medium 600 for implementing the content-aware type-on-path generation techniques described herein. In various embodiments, the computer-readable storage medium 600 is accessed by a processor 602 over a computer interconnect 604. For example, in some embodiments, the computer-readable storage medium 600 is the same as, or similar to, the computer-readable storage medium described with respect to the computing system 400 of FIG. 4 and/or the network environment 500 of FIG. 5.

In various embodiments, the computer-readable storage medium 600 includes code (i.e., computer-executable instructions) to direct the processor 602 to perform the operations of the present techniques. Such code may be stored within the computer-readable storage medium 600 in the form of program modules, where each module includes a set of computer-executable instructions that, when executed by the processor 602, cause the processor 602 to perform a corresponding set of operations. In particular, in various embodiments, the computer-readable storage medium 600 includes a content-aware type-on-path generation module 606 that directs the processor 602 to perform the content-aware type-on-path generation techniques described herein. Moreover, in various embodiments, the content-aware type-on-path generation module 606 accomplishes this via one or more sub-modules. Such sub-modules may include, but are not limited to, a salient object detection sub-module 608 that directs the processor 602 to utilize a CNN model (e.g., an R-CNN model) to detect one or more salient objects within a digital image that has been surfaced via a graphics GUI of a graphics application, a contour map generation sub-module 610 that directs the processor 602 to generate a contour map for each detected salient object, a path generation sub-module 612 that directs the processor 602 to generate a path along the contours of each salient object by applying a defined offset to the corresponding contour map, a salient object selection sub-module 614 that directs the processor 602 to receive user input including a selection of a salient object to which type-on-path is to be applied, and a text character application sub-module 616 that directs the processor 602 to generate the desired type-on-path by applying the input text characters along the path for the selected salient object, as described herein.

Moreover, those skilled in the art will appreciate that any suitable number of the modules shown in FIG. 6 may be included within the computer-readable storage medium 600. Furthermore, any number of additional modules/sub-modules not shown in FIG. 6 may be included within the computer-readable storage medium 600, depending on the details of the specific implementation.

The present techniques may be susceptible to various modifications and alternative forms, including (but not limited to) those described in the following examples:

Example 1 is a method for content-aware type-on-path generation. The method is implemented via a computing system including a processor. The method includes: surfacing an image via a graphics GUI of a graphics application; detecting a salient object within the image using a CNN model; generating a contour map for the detected salient object; generating a path along contours of the salient object by applying a defined offset to the contour map; and applying input text characters as type-on-path along the generated path based at least on user input received via the graphics GUI.

Example 2 includes the method of example 1, including or excluding optional features. In this example, the CNN model includes an R-CNN model.

Example 3 includes the method of example 1 or 2, including or excluding optional features. In this example, the method includes training the CNN model using an image dataset including a number of object classes.

Example 4 includes the method of example 3, including or excluding optional features. In this example, the method includes updating the CNN model based on new object classes added to the image dataset.

Example 5 includes the method of any one of examples 1 to 4, including or excluding optional features. In this example, the method includes detecting the salient object within the image using the CNN model by: analyzing the image using the CNN model; generating potential object proposals by computing bounding areas around potential objects within the image; computing saliency scores for each generated potential object proposal; and selecting the object with the highest saliency score as the salient object within the image.

Example 6 includes the method of example 5, including or excluding optional features. In this example, selecting the object with the highest saliency score as the salient object includes selecting all objects with saliency scores above a predefined threshold as salient objects within the image.

Example 7 includes the method of any one of examples 1 to 6, including or excluding optional features. In this example, generating the contour map for the detected salient object includes: generating a mask for the salient object based on a computed bounding area for the salient object; extracting the contours of the salient object from the generated mask; and generating the contour map for the salient object based on the extracted contours.

Example 8 includes the method of any one of examples 1 to 7, including or excluding optional features. In this example, generating the path along the contours of the salient object by applying the defined offset to the contour map includes: generating first tangential lines tangentially to the contour map at predefined intervals along the contour map; generating perpendicular lines perpendicularly to the first tangential lines, where a length of each perpendicular line is equal to the defined offset; marking an end of each perpendicular line as a coordinate of the path; and joining all the marked coordinates together to generate the path along the contours of the salient object.

Example 9 includes the method of any one of examples 1 to 8, including or excluding optional features. In this example, applying the input text characters as the type-on-path along the generated path includes: generating second tangential lines tangentially to the path at predefined intervals along the path; and applying the input text characters perpendicularly to the second tangential lines.

Example 10 includes the method of example 9, including or excluding optional features. In this example, the method includes: applying the input text characters perpendicularly to the second tangential lines at an initial font size; computing an adjusted font size that enables all the input text characters to be applied evenly along the path; recalculating the second tangential lines according to the adjusted font size; and reapplying the input text characters perpendicularly to the second tangential lines at the adjusted font size.

Example 11 includes the method of any one of examples 1 to 10, including or excluding optional features. In this example, the method includes executing, via a network, the graphics application on a remote computing system; and surfacing the image on a display device of the remote computing system.

Example 12 includes the method of any one of examples 1 to 10, including or excluding optional features. In this example, the method includes executing the graphics application locally on the computing system; and surfacing the image on a display device of the computing system.

Example 13 includes the method of any one of examples 1 to 12, including or excluding optional features. In this example, the method is executed for a plurality of detected salient objects.

Example 14 is a computing system. The computing system includes a processor and a computer-readable storage medium operatively coupled to the processor. The computer-readable storage medium includes computer-executable instructions that, when executed by the processor, cause the processor to: surface an image via a graphics GUI of a graphics application; detect a salient object within the image using a CNN model; generate a contour map for the detected salient object; generate a path along contours of the salient object by applying a defined offset to the contour map; and apply input text characters as type-on-path along the generated path based at least on user input received via the graphics GUI.

Example 15 includes the computing system of example 14, including or excluding optional features. In this example, the computer-readable storage medium includes computer-executable instructions that, when executed by the processor, cause the processor to: train the CNN model using an image dataset including a number of object classes; and update the CNN model based on new object classes added to the image dataset.

Example 16 includes the computing system of example 14 or 15, including or excluding optional features. In this example, the computer-readable storage medium includes computer-executable instructions that, when executed by the processor, cause the processor to detect the salient object within the image using the CNN model by: analyzing the image using the CNN model; generating potential object proposals by computing bounding areas around potential objects within the image; computing saliency scores for each generated potential object proposal; and selecting the object with the highest saliency score as the salient object within the image.

Example 17 includes the computing system of any one of examples 14 to 16, including or excluding optional features. In this example, the computer-readable storage medium includes computer-executable instructions that, when executed by the processor, cause the processor to generate the contour map for the detected salient object by: generating a mask for the salient object based on a computed bounding area for the salient object; extracting the contours of the salient object from the generated mask; and generating the contour map for the salient object based on the extracted contours Example 18 includes the computing system of any one of examples 14 to 17, including or excluding optional features. In this example, the computer-readable storage medium includes computer-executable instructions that, when executed by the processor, cause the processor to generate the path along the contours of the salient object by: generating first tangential lines tangentially to the contour map at predefined intervals along the contour map; generating perpendicular lines perpendicularly to the first tangential lines, where a length of each perpendicular line is equal to the defined offset; marking an end of each perpendicular line as a coordinate of the path; and joining all the marked coordinates together to generate the path along the contours of the salient object.

Example 19 is a computer-readable storage medium. The computer-readable storage medium includes computer-executable instructions that, when executed by a processor, cause the processor to surface an image via a graphics GUI of a graphics application; detect a salient object within the image using a CNN model; generate a contour map for the detected salient object; generate a path along contours of the salient object by applying a defined offset to the contour map; and apply input text characters as type-on-path along the generated path based at least on user input received via the graphics GUI.

Example 20 is the computer-readable storage medium of example 19, including or excluding optional features. In this example, the computer-executable instructions, when executed by the processor, cause the processor to: train the CNN model using an image dataset including a number of object classes; and update the CNN model based on new object classes added to the image dataset.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process. However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for content-aware type-on-path generation, wherein the method is implemented via a computing system comprising a processor, and wherein the method comprises:
    surfacing an image via a graphics graphical user interface (GUI) of a graphics application;
    detecting a salient object within the image using a convolutional neural network (CNN) model;
    generating a contour map for the detected salient object;
    generating a path along contours of the salient object by applying a defined offset to the contour map; and
    applying input text characters as type-on-path along the generated path based at least on user input received via the graphics GUI.

2. The method of claim 1, wherein the CNN model comprises a region-based CNN (R-CNN) model.

3. The method of claim 1, comprising training the CNN model using an image dataset comprising a plurality of object classes.

4. The method of claim 3, comprising updating the CNN model based on new object classes added to the image dataset.

5. The method of claim 1, wherein detecting the salient object within the image using the CNN model comprises:
    analyzing the image using the CNN model;
    generating potential object proposals by computing bounding areas around potential objects within the image;
    computing saliency scores for each generated potential object proposal; and
    selecting the object with the highest saliency score as the salient object within the image.

6. The method of claim 5, wherein selecting the object with the highest saliency score as the salient object comprises selecting all objects with saliency scores above a predefined threshold as salient objects within the image.

7. The method of claim 1, wherein generating the contour map for the detected salient object comprises:
    generating a mask for the salient object based on a computed bounding area for the salient object;
    extracting the contours of the salient object from the generated mask; and
    generating the contour map for the salient object based on the extracted contours.

8. The method of claim 1, wherein generating the path along the contours of the salient object by applying the defined offset to the contour map comprises:
    generating first tangential lines tangentially to the contour map at predefined intervals along the contour map;
    generating perpendicular lines perpendicularly to the first tangential lines, wherein a length of each perpendicular line is equal to the defined offset;
    marking an end of each perpendicular line as a coordinate of the path; and
    joining all the marked coordinates together to generate the path along the contours of the salient object.

9. The method of claim 1, wherein applying the input text characters as the type-on-path along the generated path comprises:
    generating second tangential lines tangentially to the path at predefined intervals along the path; and
    applying the input text characters perpendicularly to the second tangential lines.

10. The method of claim 9, comprising:
    applying the input text characters perpendicularly to the second tangential lines at an initial font size;
    computing an adjusted font size that enables all the input text characters to be applied evenly along the path;
    recalculating the second tangential lines according to the adjusted font size; and
    reapplying the input text characters perpendicularly to the second tangential lines at the adjusted font size.

11. The method of claim 1, comprising:
    executing, via a network, the graphics application on a remote computing system; and
    surfacing the image on a display device of the remote computing system.

12. The method of claim 1, comprising:
    executing the graphics application locally on the computing system; and
    surfacing the image on a display device of the computing system.

13. The method of claim 1, comprising executing the method for a plurality of detected salient objects.

14. A computing system, comprising:
    a processor; and
    a computer-readable storage medium operatively coupled to the processor, the computer-readable storage medium comprising computer-executable instructions that, when executed by the processor, cause the processor to:
        surface an image via a graphics graphical user interface (GUI) of a graphics application;
        detect a salient object within the image using a convolutional neural network (CNN) model;
        generate a contour map for the detected salient object;
        generate a path along contours of the salient object by applying a defined offset to the contour map; and
        apply input text characters as type-on-path along the generated path based at least on user input received via the graphics GUI.

15. The computing system of claim 14, wherein the computer-readable storage medium comprises computer-executable instructions that, when executed by the processor, cause the processor to:
    train the CNN model using an image dataset comprising a plurality of object classes; and
    update the CNN model based on new object classes added to the image dataset.

16. The computing system of claim 14, wherein the computer-readable storage medium comprises computer-executable instructions that, when executed by the processor, cause the processor to detect the salient object within the image using the CNN model by:

analyzing the image using the CNN model;

generating potential object proposals by computing bounding areas around potential objects within the image;

computing saliency scores for each generated potential object proposal; and selecting the object with the highest saliency score as the salient object within the image.

17. The computing system of claim 14, wherein the computer-readable storage medium comprises computer-executable instructions that, when executed by the processor, cause the processor to generate the contour map for the detected salient object by:

generating a mask for the salient object based on a computed bounding area for the salient object;

extracting the contours of the salient object from the generated mask; and generating the contour map for the salient object based on the extracted contours.

18. The computing system of claim 14, wherein the computer-readable storage medium comprises computer-executable instructions that, when executed by the processor, cause the processor to generate the path along the contours of the salient object by:

generating first tangential lines tangentially to the contour map at predefined intervals along the contour map;

generating perpendicular lines perpendicularly to the first tangential lines, wherein a length of each perpendicular line is equal to the defined offset;

marking an end of each perpendicular line as a coordinate of the path; and joining all the marked coordinates together to generate the path along the contours of the salient object.

19. A computer-readable storage medium comprising computer-executable instructions that, when executed by a processor, cause the processor to:

surface an image via a graphics graphical user interface (GUI) of a graphics application;

detect a salient object within the image using a convolutional neural network (CNN) model;

generate a contour map for the detected salient object;

generate a path along contours of the salient object by applying a defined offset to the contour map; and apply input text characters as type-on-path along the generated path based at least on user input received via the graphics GUI.

20. The computer-readable storage medium of claim 19, wherein the computer-executable instructions, when executed by the processor, cause the processor to:

train the CNN model using an image dataset comprising a plurality of object classes; and update the CNN model based on new object classes added to the image dataset.

\* \* \* \* \*